United States Patent [19]
Dunn, Jr.

[11] 4,378,337
[45] Mar. 29, 1983

[54] STILL HEATING PROCESS FOR PURIFYING ALUMINUM CHLORIDE

[75] Inventor: Wendell E. Dunn, Jr., Spearfish, S. Dak.

[73] Assignee: Reynolds Metals Company, Richmond, Va.

[21] Appl. No.: 383,701

[22] Filed: Jun. 1, 1982

Related U.S. Application Data

[63] Continuation-in-part of Ser. No. 255,548, Apr. 20, 1981, abandoned.

[51] Int. Cl.³ .................................................. C01F 7/62
[52] U.S. Cl. .................................. 423/135; 423/495; 201/19
[58] Field of Search .................. 423/133, 135, 495; 201/19

[56] References Cited

U.S. PATENT DOCUMENTS

| | | | |
|---|---|---|---|
| 3,406,009 | 10/1968 | Gould et al. | 423/495 |
| 3,938,969 | 2/1976 | Sebenik et al. | 423/495 |
| 4,039,648 | 8/1977 | Haupin et al. | 423/495 |
| 4,083,923 | 4/1978 | Tippman et al. | 423/495 |

Primary Examiner—Herbert T. Carter
Attorney, Agent, or Firm—Lyne, Girard & McDonald

[57] ABSTRACT

In a process for purifying aluminum chloride made by the high temperature chlorination of an aluminum value containing material by distilling the aluminum chloride in a still, and separating the aluminum chloride the improvement comprising adding sufficient alkali chloride to the aluminum chloride as to provide an aluminum chloride/alkali chloride mixture having a conductivity sufficient to permit internal electrical resistance heating of the still when an electric current is applied across the still mixture.

3 Claims, No Drawings

STILL HEATING PROCESS FOR PURIFYING ALUMINUM CHLORIDE

This application is a continuation-in-part of Ser. No. 255,548, filed Apr. 20, 1981 and now abandoned.

BACKGROUND OF THE INVENTION

1. Field of the Invention

The present invention relates to the manufacture of aluminum chloride and more particularly to an improved method for accomplishing heating of aluminum chloride in a distillation/purification process.

Description of the Prior Art

The purification of aluminum chloride has long been a perplexing problem, so difficult that current aluminum chloride manufacture avoids the problem by using pure alumina from the Bayer process with low levels of iron, titanium and silicon impurities as the source of aluminum for the manufacture of aluminum chloride. This is, of course, more expensive than direct chlorination of bauxite or other aluminous ores since the processing of the bauxite through dissolution, precipitation and drying steps is highly energy intensive. In addition to the economic disadvantage, there is the growing difficulty of obtaining low silica bauxite as the high grade bauxites are becoming exhausted or more difficult to obtain. Purification by partial condensation of the chlorination process vapors has been shown repeatedly to be an inadequate purification method not only for the separation of iron chloride but also for the separation of silicon and titanium chlorides, particularly titanium which is more difficult to separate and has a more deleterious effect on the final aluminum metal.

Purification by absorption to other high boiling liquids has also been proposed but such systems are complex and add expensive stages to the manufacturing process. Even more undesirable is the problem of reboiling the aluminum chloride from the absorbing liquids. Because of the corrosive nature of aluminum chloride melts the problem of heat transfer through a surface to the still emerges.

Although there are many materials of construction, the constraints of corrosion and high temperature and the need for high heat conductivity limit the choice of materials for heat transfer severely.

The design of an aluminum chloride still divides into the problem of heat transfer to and from the aluminum chloride and the problem of gas-liquid contact. The latter problem can be handled by routine still techniques using ceramic or glass packing and allowing the gas liquid contact to produce the stage wise or differential packed bed contact as desired. The heat transfer on the cooling or condensation side provides no difficulty provided the surface is not over cooled in the condensation stage. On the other hand, heat transfer to provide boil up of aluminum chloride does cause difficulty because of the corrosive nature of the aluminum chloride.

Although the heat could be transferred through a ceramic surface, extensive surface such as needed for such large scale heat transfer becomes expensive and impractical. Similarly, carbon heat transfer surfaces are also undesirable because of the intercalation compounds which are made between iron and aluminum chloride and graphite.

Unfortunately, aluminum chloride and associated covalent impurity chlorides are not satisfactory conductors of electricity so resistance heating, although highly desirable, is not practical in a conventional system.

SUMMARY OF THE INVENTION

I have found that the addition of small amounts of alkali chloride to aluminum chloride provides an ionic complex which conducts electricity well enough to make electrical heating a practical method of heating an aluminum chloride still.

Accordingly, I have discovered, in a process for purifying aluminum chloride made by the high temperature chlorination of an aluminum value containing material by distilling the aluminum chloride in a still, and separating the aluminum chloride, the improvement comprising adding sufficient alkali chloride to the aluminum chloride as to provide an aluminum chloride/alkali chloride mixture having a conductivity sufficient to permit electrical resistance heating of the still.

DETAILED DESCRIPTION

The conductivity of pure aluminum chloride is of the order of $10^{-7}$ reciprocal ohm-centimeters. The addition of an alkali complexing chloride such as, for example, sodium chloride or potassium chloride will increase the conductivity by six orders of magnitude to a conductivity very convenient for electrical heating. This invention provides for an alkali chloride addition to the still bottoms into which the aluminum chloride liquid refluxes. The boil-up aluminum chloride gas containing small amounts of the chloride complex which is widely different in vapor pressure can then be rectified in a plate still or packed column with heat removed at the reflux condenser above the feed point. The presence of the alkali chloride permits internal heating of the still when electrical current is applied to electrodes mounted in spaced relationship within the still such that the current passes through the aluminum chloride/alkali chloride mixture in the still resulting in the generation of internal resistance heating of the still. Thus, many of the heat transfer problems encountered in the prior art are precluded.

The alkali chloride will remain in the still pot and serve as a collecting point for other impurities which form less volatile complexes or which are low vapor pressure solids at the pot boiling temperature.

Water cooling of the pot exterior will completely protect the metal because a layer of solid chloride will form, which, being solid, is inert and non-corrosive.

If desired, the metal of the pot or a portion thereof may be colled to less than the solidus temperature of the still pot mixture which will allow it to serve as an electrode at the same time being far less attacked by the corrosive aluminum chloride than it would be at the boiling temperature existing between the boundary layer of cooled mixture and the metal surface.

Similarly, the other electrode in the interior of the vessel can be cooled to a temperature just above the melting point so that conductivity is established and a current can flow to provide resistance heating.

According to a preferred embodiment of the present invention, the amount of alkali chloride added to the still pot ranges from about 0.1 to about 50 mol percent. Concentrations above this range do not significantly increase conductivity while potentially posing contamination problems. Below the aforementioned concentration range, no significant increase in conductivity is produced. Most preferably, the amount of alkali chloride added ranges from about 1 to about 10 mol percent.

The particular alkali chloride added is not of significance, lithium, sodium or potassium chlorides being equally useful to improve conductivity.

I claim:

1. A process for purifying aluminum chloride made by the high temperature chlorination of an aluminum value containing material by distilling the aluminum chloride in a still, and separating the aluminum chloride the improvement comprising adding sufficient alkali chloride to the aluminum chloride as to provide an aluminum chloride/alkali chloride mixture having a conductivity sufficient to permit electrical resistance heating of the still, and heating the still by resistance heating by passing a current through the aluminum chloride/alkali chloride mixture in the still.

2. The improved method of claim 1 wherein the amount of alkali chloride added to the aluminum chloride ranges from about 0.1 to about 50 mol percent.

3. The process of claim 1 wherein the amount of alkali chloride added to the aluminum chloride ranges from about 1 to about 10 mol percent.

* * * * *